Sept. 13, 1966   J. F. PRIBONIC   3,272,174

REMOTE LEVEL INDICATION

Filed Sept. 7, 1965

INVENTOR.
JOHN F. PRIBONIC
BY
Albert T. Reutter
HIS ATTORNEY 3,272,174
REMOTE LEVEL INDICATION
John F. Pribonic, Dayton, Ohio, assignor to General Motors Corporation, Detroit, Mich., a corporation of Delaware
Filed Sept. 7, 1965, Ser. No. 485,282
10 Claims. (Cl. 116—118)

This invention relates to indication of content level, and more particularly, to use of a fiber optic system therewith.

A problem exists in obtaining an accurate indication of content level in a storage tank or container at a location remote therefrom. Various float and lever devices are available. However, such devices generally have movable parts which malfunction or result in wear that causes failure to obtain accurate readings or indication of measured level. Accordingly, an object of the present invention is to provide a static remote level indication that uses an electrically energized light source having insulation mounting in a storage tank and a plurality of fiber optic elements of differing lengths that transmit light ray indication of differing content level conditions in a remote location directly as a graduated liquid level indicator.

Another object of this invention is to provide in combination a vehicle fuel storage tank having illumination directly therein and fiber optic system to indicate content level thereof.

A further object of this invention is to provide in combination a liquid fuel storage tank mounted in a vehicle and having a source of light directly therein as well as a plurality of fiber optic elements grouped in a bundle including differing lengths that terminate in the tank. The fiber optic elements extend to an indicating location such as on a dashboard means. Orientation of fiber optic element ends in a graduated scale marking is illuminated in accordance with linearly proportionate decrease in liquid fuel left in the tank.

Another object of this invention is to provide a static fuel gauge means having a plurality of bundled fiber optic elements which extend between an observation location at one end thereof and a fuel storage container means internally illuminated. Differing lengths of individual fiber optic elements project into the container means. In accordance with variation of fuel level in the container means, a shielding of one or more ends of fiber optic elements results in difference in light rays transmitted thereby as a linear fuel indication free of moving parts. Maintenance and cost of complex components is appreciably reduced by this fiber optic fuel gauge system.

Further objects and advantages will be apparent from the accompanying drawings wherein preferred embodiments of the present invention are clearly shown.

Figure 2:
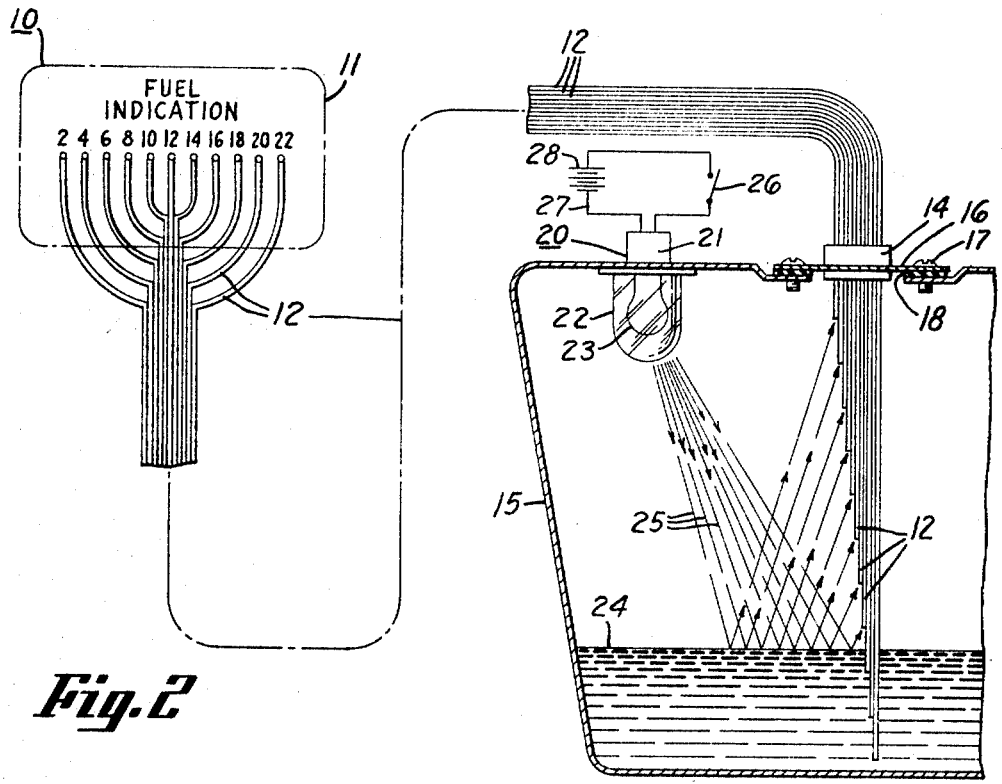
FIGURE 2 is a diagrammatic representation of features of the system of FIGURE 1.
Figure 1:
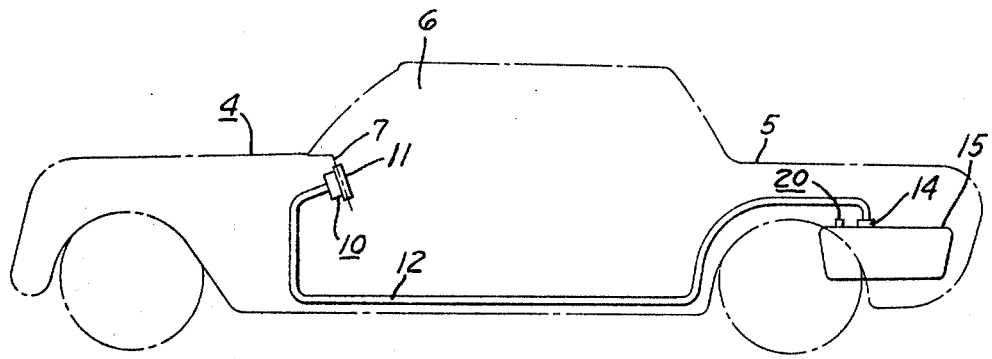
FIGURE 1 is a side view of a vehicle having a fuel storage tank in combination with a fiber optic level indication system.

FIGURE 1 shows a motorized vehicle generally indicated by numeral 4 having a body portion 5 in which there is a compartment 6 for seating of passengers and a driver or operator in a well known manner. The vehicle includes a dashboard means 7 for mounting of various instruments including a static fuel gauge means generally indicated by numeral 10 having features in accordance with the present invention. This static fuel gauge means includes a decorative though useful electro-luminescent paneling 11 having fuel indication markings thereon as shown in FIGURE 2. The paneling 11 is made of suitable material as disclosed for example in a copending application S.N. 212,695—Merica filed July 26, 1962, now abandoned. The fuel indication results from transmission of light through fiber optic means or elements 12 in a collective bundle. At one end of the fiber optic bundle 12 these elements are spread into substantially U-shaped fan configuration which is substantially symmetrical as to a central fiber optic element representing the half way full condition in a linearly graduated scale of even integers as illustrated in FIGURE 2. An example of a method of making light-conducting fibers is given in a Patent 3,146,082—Hicks et al. issued August 25, 1964. Another Patent 3,188,188—Norton issued June 8, 1965, discloses apparatus for making fiber optical components. The bundle of fiber optic elements 12 passes from the dashboard means 7 supporting the fuel gauge means 11 downwardly adjacent to a lower portion of the vehicle 4 as shown in FIGURE 1. A suitable bushing 14 for sealing purposes provides passage of the fiber optic bundle 12 into a storage tank or container 15. This storage tank or container is made of metal and a plate 16 with suitable fasteners or screws 17 and a sealing washer 18 are provided for mounting of the fiber optic bundle with a bushing 14 as to the storage tank 15. It is to be understood that the fuel storage tank or container 15 is suitably supported and carried by the vehicle and reference is made to copending application S.N. 383,384—Moorman filed July 17, 1964, belonging to the assignee of the present invention for further details as to other plastic storage tank structure also usable in accordance with the present invention.

The storage tank 15 has mounted directly therewith an illuminating means generally indicated by numeral 20. The illuminating means includes a socket 21 suitably sealed as to the storage tank and including a translucent covering of glass or plastic 22 for shielding of a lamp bulb means or illuminator 23 housed directly within the storage tank 15. Within the storage tank 15 the bundle of fiber optic elements 12 is grouped rigidly and vertically by a suitable bonding means or adhesive such as epoxy resin material though free ends of the fiber optic elements per se are left exposed in a graduated manner represented in FIGURE 2. This graduated or stair-step configuration of fiber optic elements terminating directly within the storage tank means has a purpose for linear indication of content of liquid level of fuel 24 which hinders or displaces transmission of light rays 25 from the illuminator or lamp bulb means 23. Thus when content of fuel 24 is sufficiently deep for example to cover the ends of fiber elements for fuel indication that three fiber optic ends are still covered with liquid, such ends will be adversely affected as to transmission of light and the last three gradations such as for 2, 4, and 6 gallon or liter content of fuel will appear darker on the fuel indication paneling 11 as compared with ends of fiber optic elements transmitting bright light to the fuel indication representing that portion of the storage tank which is empty or drained of its content of fuel. A suitable switching means 26 connected by circuitry 27 to a battery or power source 28 as represented in FIGURE 2 provides energization of the illuminator means or lamp bulb 23. The switch 26 is shown as an example only and it is to be understood that an ignition switch in a vehicle will provide similar interconnection.

The static fiber optic element bundling 12 involves no moving parts though providing a linear liquid level indication. Such fiber optic elements in combination with a fuel gauge means of a vehicle provides direct indication. Movement of any float such as disclosed in a copending application S.N. 417,266—Zimmerle filed December 10, 1964, belonging to the assignee of the present invention, is eliminated though linear liquid level indication is improved.

It is to be understood that respective fibers in the storage tank or container are cut to have progressively higher position as terminating in the tank or container. These fibers at a location remote from the storage container terminate in a graduated scale and oriented in a visible manner to indicate the height position of material or liquid in the tank. Each individual fiber optic element 12 per se is subject to illumination from the light source directly in the tank unless the particular fiber optic element is submerged and shielded. An occupant of the vehicle 4 is able to judge level in the storage container or tank by noting how many fiber elements per se are transmitting light and how many are not. It is to be understood that use of fiber optics is possible and within the purview of this invention both where indicating solid as well as liquid levels of materials remotely located in containers having a light source directly therein in predetermined positioning in a location parallel to mounting of the fiber optic bundle on one side of the storage container or tank.

While the embodiments of the present invention as herein disclosed constitute preferred forms, it is to be understood that other forms might be adopted.

What is claimed is as follows:

1. In combination for use with a storage container located remote from panelling having predetermined graduated scale marking as to level content, a fiber optic level system including an energizable illuminating source directly in the container, and a single fiber optic bundle of light transmitting elements collectively of differing lengths in a graduated scale of even integers of steps of each light transmitting element per se within the storage container and having ends thereof remote from the container terminating at the panelling, each said element per se having the end thereof subject to content immersion whereby light transmittal individually is darkened from said illuminating source directly in the container.

2. The combination system of claim 1 wherein said ends remote from the container have a spread symmetrical fan configuration linearly in indication due to differential in light transmission directly by predetermined fiber optic elements, said spread symmetrical fan configuration having integral relation entirely with said single fiber optic bundle of light transmitting elements.

3. The combination system of claim 1 wherein said illuminating source and said single fiber optic bundle are mounted sealingly in locations substantially parallel to each other on one side of said container having a completely closed configuration.

4. The combination system of claim 3 wherein said illuminating source has a translucent cover seal thereon as a shield against splashing liquid fuel material in said container, said single fiber optic bundle being grouped rigidly and vertically by bonding material.

5. The combination system of claim 3 wherein said illuminating source has a translucent cover seal thereon as a shield against solid powdery material in said container, said single fiber optic bundle being grouped rigidly and vertically by epoxy resin bonding material.

6. The combination system of claim 2 wherein said fan configuration is substantially U-shaped, provides linear fuel gauge indication on a motorized vehicle having a dashboard portion on which said panelling is located.

7. The combination system of claim 2 wherein stair-step rigid mounting of fiber optic elements is provided in the storage container and said single fiber optic bundle is maintained vertical by epoxy resin bonding material.

8. The combination system of claim 1 wherein a switch in circuitry externally connected to a vehicle battery is provided for energization of said illuminating source internally of said container.

9. The combination system of claim 8 wherein said illuminating source is mounted in the container in a location parallel to stair-step projection of fiber optic elements vertically in said single fiber optic bundle, both said illuminating source and said single fiber optic bundle extending into the container.

10. As an improvement on a vehicle fuel indication system including a closed storage container located remote from panelling of dashboard structure having predetermined graduated scale marking as to level content in the container by a fiber optic level system, the combination therewith which comprises only a single fiber optic bundle of light transmitting elements grouped at least in the storage container in a rigid and vertical position by epoxy resin bonding material, and only a single electrically energizable illuminating source also rigid and vertical as mounted expressly inside the container, said illuminating source having a translucent covering for lamp shielding sealingly protected against container content access during vehicle movement as well as vibration, said single fiber optic bundle having elements thereof per se in a graduated stair-step configuration terminating directly within the storage container such that element endings per se are subject to individual immersion in container content whereby darkening of element per se thereof occurs due to container content directly between said single illuminating source and said single fiber optic bundle which terminates in a U-shaped fan configuration at the vehicle dashboard structure.

References Cited by the Examiner

UNITED STATES PATENTS

| | | | |
|---|---|---|---|
| 1,991,192 | 2/1935 | Bucky | 116—118 X |
| 2,198,443 | 4/1940 | Paul et al. | 240—8.4 |
| 2,227,861 | 1/1941 | Petrone | 88—1 |
| 2,254,932 | 9/1941 | Bryce | 88—1 |
| 2,480,178 | 8/1949 | Zinberg | 88—1 |
| 2,507,909 | 5/1950 | Kaysen | 340—380 |
| 2,561,508 | 7/1951 | Gregorie et al. | 88—1 |
| 2,873,714 | 2/1959 | Bauerlein | 116—118 |
| 2,923,157 | 2/1960 | Peifer | 116—118 |
| 3,043,910 | 7/1962 | Hicks | 88—1 |
| 3,120,125 | 2/1964 | Vasel | 73—293 |
| 3,188,188 | 6/1965 | Norton | 65—11 |

LOUIS J. CAPOZI, *Primary Examiner.*